United States Patent [19]
Johansson

[11] Patent Number: 4,919,362
[45] Date of Patent: Apr. 24, 1990

[54] FISHING REEL OF THE MULTIPLIER TYPE

[75] Inventor: Arne Johansson, Mörrum, Sweden

[73] Assignee: ABU Garcia Producktion AB, Svangsta, Sweden

[21] Appl. No.: 360,617

[22] Filed: Jun. 2, 1989

[51] Int. Cl.$^5$ .............................................. A01K 89/02
[52] U.S. Cl. ...................................... 242/303; 188/83; 242/289; 242/290
[58] Field of Search ....................... 242/289, 290, 303; 188/83

[56] References Cited

U.S. PATENT DOCUMENTS

| | | | |
|---|---|---|---|
| 3,367,598 | 2/1968 | Harrington | 242/290 |
| 3,612,436 | 10/1971 | Shakespeare | 242/290 X |
| 3,901,457 | 8/1975 | Turesson | 242/289 |
| 4,209,141 | 6/1980 | Karlsson | 242/289 |
| 4,572,454 | 2/1986 | Furomoto | 242/290 X |
| 4,618,106 | 10/1986 | Noda | 242/290 |

FOREIGN PATENT DOCUMENTS 1178448 1/1970 United Kingdom ................ 242/290

Primary Examiner—Katherine A. Matecki
Attorney, Agent, or Firm—Browdy and Neimark

[57] ABSTRACT

A fishing reel of the multiplier type has a frame with two side plates. A shaft extends through the frame and is supported by support bearing elements provided on the side plates. A line spool is rotatably mounted on the shaft, and friction brake element is arranged to brake the rotation of the spool. A shifting element is provided at one end of the shaft for axially shifting the shaft in one direction. A driver member is arranged, upon axial shifting of the shaft, to urge the spool towards the friction brake element to increase its braking effect. A resilient member having a through opening in which the shaft is inserted, is arranged both to retain the shaft against rotation and to ensure the return of the shaft after axial shifting thereof. The shaft has a circumferential groove which extends throughout at least a portion of the circumference of the shaft and in which is resilient member engages when the shaft is inserted in the opening of the resilient member. The shaft can be retracted from and reinserted in this opening under resilient expansion thereof.

3 Claims, 3 Drawing Sheets

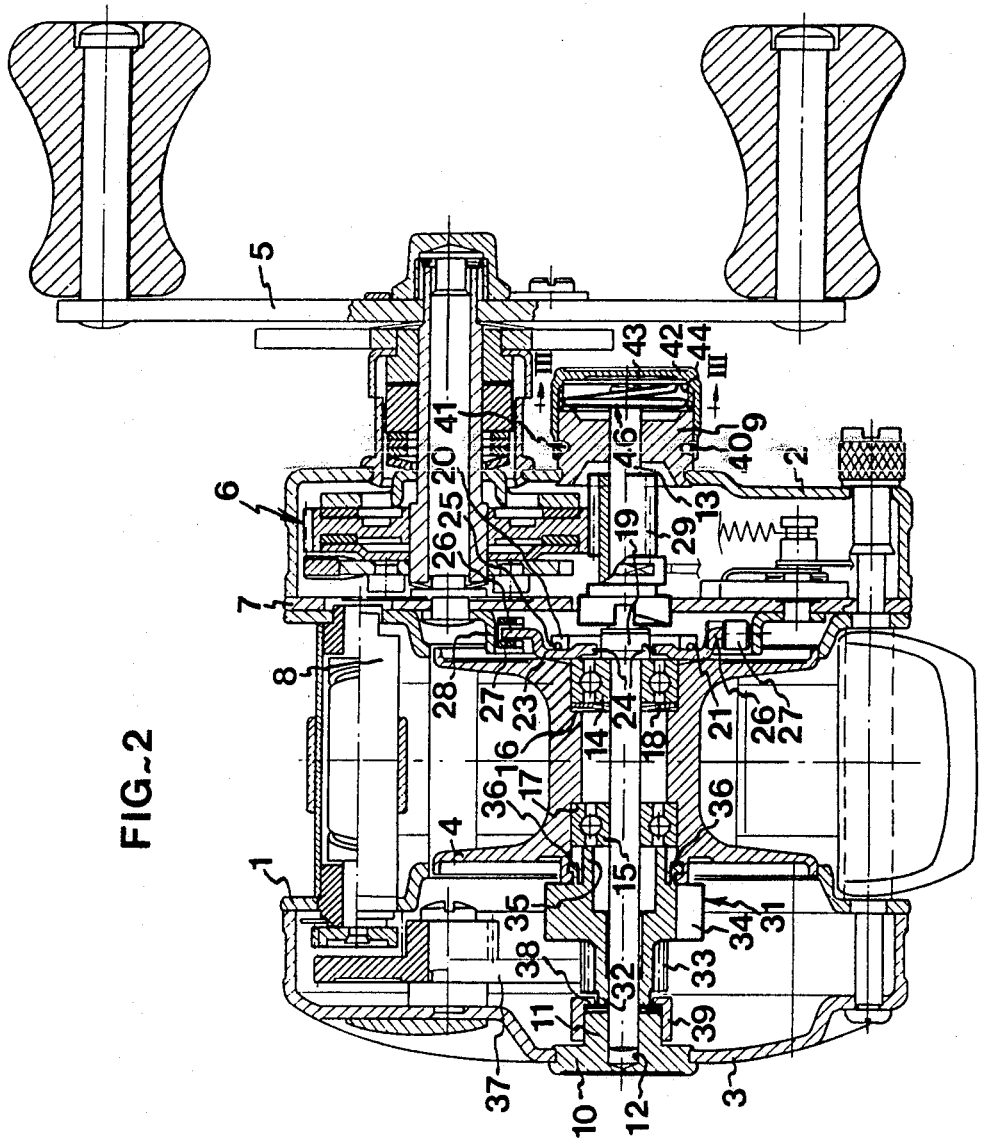
FIG._2

FIG._3
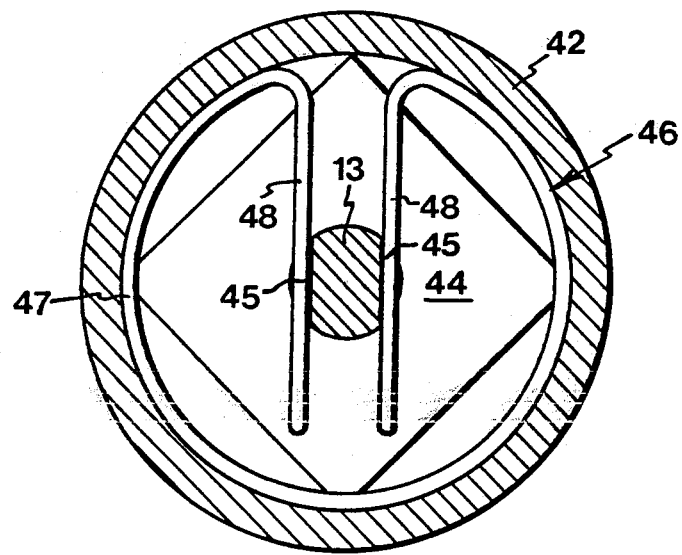
FIG._4
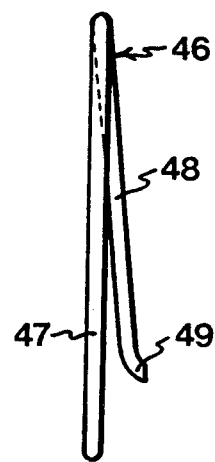

FISHING REEL OF THE MULTIPLIER TYPE

BACKGROUND OF THE INVENTION

The present invention relates to a fishing reel of the multiplier type.

Known fishing reels of this type generally have a frame with two side plates, a shaft extending through the frame and mounted in rotary bearings in the two side plates, and a line spool which is non-rotatably mounted on the shaft for rotating with it. To prevent the spool, during casting, from rotating at such a high speed that the line cannot be paid out at the same rate but instead rises, forming a so-called birdnest, these prior art fishing reels are provided with a mechanical brake, usually being a friction brake. The braking power of the friction brake can be adjusted by axial displacement of the shaft by means of a turnable knob acting on one end of the shaft. For the same purpose, use is generally made also of a further brake in the form of a centrifugal or a magnetic brake.

The shaft extends in the frame through different components, such as gear wheels and the like, which are mounted on the shaft. By frictional forces, these components affect to a certain extent the rotation of the shaft and, thus, of the spool and limit the possibility of making long casts. If the shaft, the manufacturing tolerances of which are extremely narrow, is slightly skew, for instance as a result of careless handling when servicing the fishing reel, such skewness gives rise to vibrations and noise when the shaft and, thus, the spool are rotating.

To overcome this drawback and provide a fishing reel with which very long casts can be made and in which said noise has been reduced, designers of modern reel types have replaced the shaft mounted in rotary bearings in the side plates with a shaft supported therein by means of support bearings and replaced the line spool non-rotatably mounted on the shaft with a line spool rotatably mounted on the shaft by means of rotary bearings. In this way, the spool will not be braked by components mounted on the shaft, and possible skewness of the shaft will not have the same consequences as in the design first described. However, this new design suffers from the drawback that the shaft sometimes rotates, giving rise to a jarring sound.

The object of the present invention therefore is to provide a fishing reel which overcomes also this drawback.

Another object of the present invention is to provide a fishing reel which is of such a design that mounting and dismounting of the reel can be performed very easily, and which is also easy to assemble or modify by means of different modules.

BRIEF DESCRIPTION OF THE INVENTION

According to the invention, these objects are achieved by means of a fishing reel of the multiplier type comprising a frame with two side plates;

a support bearing element on each of said side plates;

a shaft which extends through said frame and the ends of which are supported by said support bearing elements;

rotary bearing means axially displaceably mounted on said shaft;

a line spool rotatably mounted on said shaft by means of said rotary bearing means;

friction brake means for braking the rotation of the line spool;

shifting means provided at one end of said shaft for axially shifting said shaft in one direction;

driver means provided on said shaft and adapted, upon axial shifting of the shaft in said one direction, to urge the line spool towards said friction brake means to increase the braking effect thereof; and resilient means having a through opening in which said shaft is inserted, and adapted to retain said shaft against rotation and to resiliently counteract shifting of said shaft in said one direction so as to ensure return of the shaft in the opposite direction, said one end of said shaft having a circumferential groove which extends throughout at least a portion of the circumference of the shaft and in which said resilient means engages when said shaft is inserted in the opening of said resilient means, and said shaft being retractable from and reinsertable into said opening under resilient expansion thereof.

In a preferred embodiment, the one support bearing element located at said one end of said shaft is provided with an external thread, said shifting means comprises a bearing cap having an internal thread and screwed on said one support bearing element, and said resilient means is provided inside said bearing cap in order, while bearing on said one support bearing element, to press said one end of said shaft against the bottom of said bearing cap.

Said resilient means preferably comprises a metal wire bent substantially into annular shape and non-rotatably mounted in said bearing cap.

Alternatively, said resilient means comprises a spring washer having axial resilient projections for engaging said one support bearing element and being non-rotatably mounted in said bearing cap.

The invention will now b described in more detail with reference to the accompanying drawings.

BRIEF DESCRIPTION OF THE DRAWINGS

FIG. 2 is an enlarged longitudinal section of the fishing reel shown in FIG. 1.

FIG. 3 is an enlarged sectional view taken along the line III—III in FIG. 2 and showing in particular a resilient member.

FIG. 4 is a side view of the resilient member.

DETAILED DESCRIPTION OF THE INVENTION

Figure 1:
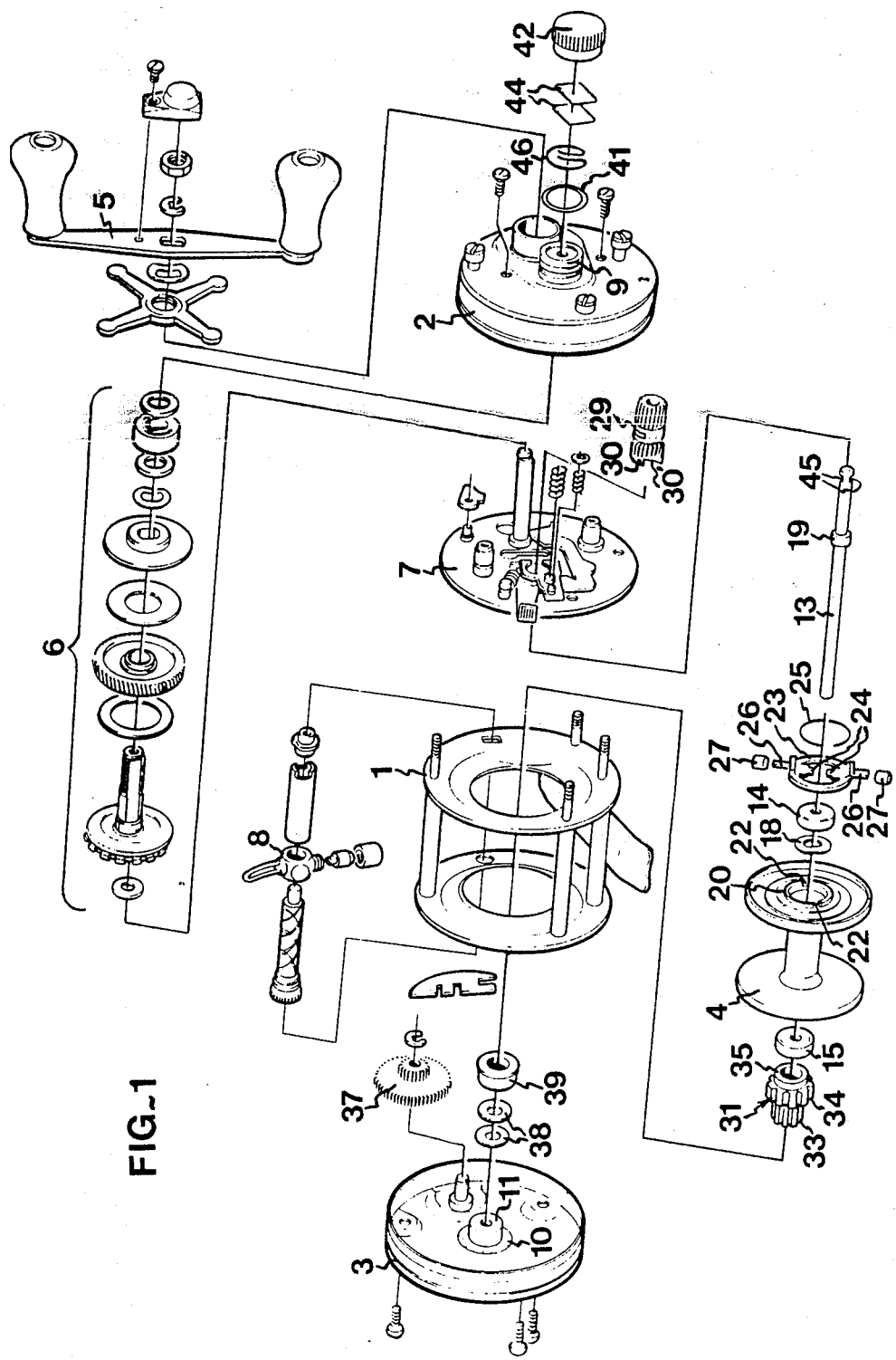
FIG. 1 is an exploded view showing a fishing reel according to the present invention.

The fishing reel of the multiplier type as illustrated in the drawings has a frame 1 with detachable side plates 2 and 3, a spool 4 mounted in the frame 1 for receiving a fishing line (not shown), a handle 5 with an associated transmission mechanism 6 for rotating the line spool 4, a mounting plate 7 fixed on the frame 1 and supporting the handle 5 and the transmission mechanism 6, and a level-wind mechanism 8 mounted in the frame 1.

The handle 5 with the associated transmission mechanism 6, the mounting plate 7 and the other components supported thereby, as well as the level-wind mechanism 8 are all of conventional type and therefore will not be described in more detail here.

The right side plate 2 has a central through opening in which a support bearing 9 is fixed. The support bearing 9 is in the form of an externally threaded sleeve projecting from the outside of the side plate 2. The left side plate 3 also has a central through opening in which a support bearing 10 is fixed. The bearing 10 has an axial projection 11 which extends inwardly and has a blind bore 12, the diameter of which is equal to the inner diameter of the sleeve 9. The two support bearings 9 and 10 support the line spool shaft 13 at both ends thereof. As appears from FIG. 2, the shaft 13 passes through the bearing 9. The diameter of the shaft 13 is slightly smaller than the inner diameter of the sleeve 9 and the diameter of the blind bore 12.

The line spool 4 is rotatably supported on the shaft 13 by means of two ball bearings 14 and 15. The outer ring of each ball bearing 14 and 15 abuts with its inner end surface on a shoulder 16 and 17, respectively, within the spool. The outer ring of the right ball bearing 14 abuts on the shoulder 16 by the intermediary of a spring washer 18. The outer end surface of the left ball bearing 15 is located a certain distance inwardly of the left end surface of the line spool 4 while the outer end surface of the right ball bearing 14 is located on a level with the right end surface of the line spool 4. A radially projecting annular shoulder 19 formed on the shaft 13 bears on the outer end surface of the inner ring of the right ball bearing 14.

The line spool 4 has a ring 20 which is coaxial with the line spool and integrally formed therewith and which projects axially from the right end surface of the spool. The ring 20 has an external circumferential groove 21 and two diametrically opposed recesses 22. A clutch ring 23 is provided on the ring 20 and has two radially inwardly projecting diametrically opposed projections 24 engaging in the recesses 22 in the ring 20. The clutch ring 23 is maintained in place on the ring 20 by means of a snap ring 25 disposed in the circumferential groove 21 thereof. The clutch ring 23 further has two radially outwardly projecting diametrically opposed pins 26, each carrying a centrifugal weight 27 slidable on the respective pin 26. When the line spool 4 rotates at a high speed, the centrifugal weights 27 engage the inner circumferential surface of a brake ring 28 fixed on the left-hand side of the mounting plate 7. The centrifugal weights 27 and the brake ring 28 thus serve as a centrifugal brake for the line spool 4.

A gear wheel 29 connected to and driven by the handle 5 via the transmission mechanism 6 is mounted on the shaft 13 between the line spool 4 and the support bearing 9. The end of the gear wheel 29 facing the line spool 4 is cup-shaped with two diametrically opposed lugs 30. When the angler starts turning the handle 5 for retrieving the line, the gear wheel 29 is moved to the left from the position shown in FIG. 2 in a known manner not described in more detail here, whereby the shoulder 19 on the shaft 13 is received in the cup of the gear wheel 29 and the lugs 30 are brought into driving engagement with the projections 24 of the clutch ring 23. In order to ensure that this driving engagement takes place in a reliable and uniform manner during the rotation of the gear wheel 29, each lug 30 is preceded by an inclined cam surface 30'. Upon continued rotation of the handle 5, the line spool 4 is rotated about the shaft 13.

A gear wheel unit 31 formed as a single piece is composed of a minor sleeve 32, a minor gear wheel 33, a major gear wheel 34 an a major sleeve 35. The sleeve 35 is inserted in the line spool 4 outside the left ball bearing 15 and non-rotatably connected to the line spool 4 by means of splines (not shown). The sleeve 35 has two radially resilient projections 36 engaging in an inner circumferential groove in the line spool 4 and retaining the sleeve 35 axially therein. The minor gear wheel 33 meshes with a gear wheel 37 for driving the level-wind mechanism 8, and the major gear wheel 34 can be used, in a manner not shown in more detail, for providing a buzzer function.

A friction member 38, consisting of two friction washers of tin bronze, bears on the end surface of the axial projection 11 of the support bearing 10 and is retained thereon by a plastic cap 39 passed over the projection. The plastic cap 39 has a central opening in which the minor sleeve 32 of the gear wheel unit 31 is accommodated. The end surface of the sleeve 32 then engages the friction member 38.

The right support bearing 9 has an outer circumferential groove 40 in which an O-ring 41 is mounted. An inwardly threaded bearing cap 42 is screwed on the support bearing 9. The bearing cap 42 has an internal central recessed portion 43 in its bottom. Two spring leaves 44 of tin bronze bridging the recessed portion 43 are placed in the bearing cap 42.

In its end located in the bearing cap 42, the shaft 13 has two circumferential diametrically opposed grooves 45, the bottoms of which are parallel to each other and form a flat on the shaft. A resilient member 46 which will be described in more detail hereinbelow bears on the support bearing 9 and is urged against the inner circumferential surface of the bearing cap 42 so as to be non-rotatably retained therein. The resilient member 46 engages in the grooves 45 in the shaft 13 in order, by engaging the flat thereon, to retain the shaft 13 against rotation and, by pressing against the outer side wall of the grooves, to urge the shaft to the right, such that its right end bears on the bottom of the bearing cap 42 by the intermediary of the spring leaves 44.

As will have been appreciated, the braking effect of the friction member 38 is adjusted by means of the bearing cap 42. When the bearing cap 42 is screwed further onto the support bearing 9, it will shift the shaft 13 to the left against the action of the resilient member 46, the shoulder 19 on the shaft 13 urging the ball bearing 14 and hence the line spool 4 and the gear wheel unit 31 to the left, such that the sleeve 32 is pressed more firmly against the friction member 38, thus increasing the braking power thereof. Such an increase of the braking power may be required for instance when a heavy lure attached to the line should be cast.

When the bearing cap 42 is slightly unscrewed for reducing the braking effect of the friction member 38, the shaft 13 is shifted to the right by the action of the resilient member 46.

A preferred embodiment of the resilient member 46 is shown in more detail in FIGS. 3 and 4. This resilient member consists of a metal wire which is bent into a substantially circular flat ring 47. The two end portions 48 of the metal wire are bent substantially inwards towards the centre of the ring. The two end portions 48 define between them an opening or gap, the width of which, at the centre of the ring 47 and in the untensioned state of the resilient member 46, is less than the distance between the bottoms of the two grooves 45 of the shaft 13. As shown in FIG. 4, the end portions 48 extend obliquely rearwards, i.e. in the direction of the bottom of the bearing cap 42. At their outer ends 49, the end portions 48 are bent further backwards.

As shown in FIG. 2, the resilient member 46 bears, with the ring 47 on the support bearing 9 and with the ends or projections 49 on the spring leaves 44. The ring 47 is urged by its inherent resilient force radially outwards against the inner circumferential surface of the bearing cap 42 and is thus non-rotatably retained in the bearing cap. The end portions or shanks 48 engage in the grooves 45 of the shaft 13 and thus prevent the shaft 13 from rotating while simultaneously urging the end of the shaft 13 against the spring leaves 44.

As will have been appreciated, the shaft 13 and the resilient member 46 mounted in the bearing cap 42 can be easily dismounted from each other. This is effected by first turning the shaft 13 slightly from the position shown in FIG. 3, such that the shanks 48 of the resilient member 46 are moved apart and out of their engagement with the grooves 45 of the shaft 13, and thereafter pulling the shaft axially (to the left in FIG. 2) out of the gap between the shanks 48.

It is just as easy to mount the shaft 13 and the resilient member 46 disposed in the bearing cap 42. The shaft 13 is first inserted with its preferably bevelled or slightly pointed end into the gap between the shanks 48 and, if so required, is thereafter slightly turned so that the shanks resiliently engage in the grooves 45. Upon this insertion, the rearwardly directed ends 49 of the shanks 48 bear on the spring leaves 44 at the bottom of the bearing cap 42, thus preventing the shanks from being moved backwards by the shaft and enabling the shanks to be brought into engagement in the grooves 45.

By this easy mounting and dismounting of the shaft 13, it will be considerably easier to assemble and disassemble the entire fishing reel. Also, the shaft 13 can be readily replaced by other shafts, e.g. longer or shorter shafts, intended for a modified fishing reel, suitably composed of different modules, of which e.g. the shaft is a first module and the side plate 2 with the support bearing 9 and the components mounted thereon, i.e. the O-ring 41, the resilient member 46, the spring leaves 44 and the bearing cap 42, form a second module. A third module may consist e.g. of the spool 4 and the components mounted thereon, i.e. the spring washer 18, the ball bearings 14 and 15, the clutch ring 23 with the centrifugal weights 27, the snap ring 25 and the gear wheel unit 31. The other components may, as desired, be assembled into modules, suitable for the assembly and disassembly of the fishing reel.

The resilient member 46 need not necessarily consist of the metal wire ring 47 described above, but may be designed otherwise. For instance, it may consist of a plastic washer fitting non-rotatably in the bearing cap 42 and having a central opening for receiving the shaft 13, lugs projecting into this opening for snap engagement in the grooves 45 of the shaft 13 and nonrotatable retention of the shaft 13, and axial resilient projections for resiliently engaging the support bearing 9.

What I claim and desire to secure by Letters Patent is:

1. A fishing reel of the multiplier type, comprising
a frame with two side plates;
a support bearing element on each of said side plates;
a shaft which extends through said frame and the ends of which are supported by said support bearing elements;
rotary bearing means axially displaceably mounted on said shaft;
a line spool rotatably mounted on said shaft by means of said rotary bearing means;
friction brake means for braking the rotation of the line spool;
shifting means provided at one end of said shaft for axially shifting said shaft in one direction;
driver means provided on said shaft and adapted, upon axial shifting of the shaft in said one direction, to urge the line spool towards said friction brake means to increase the braking effect thereof; and
resilient means for resiliently counteracting shifting of said shaft in said one direction so as to ensure return of the shaft in the opposite direction, said resilient means having a through opening in which said shaft is inserted, and including means for retaining said shaft against rotation, said one end of said shaft having a circumferential groove which extends throughout at least a portion of the circumference of the shaft and in which said resilient means engages when said shaft is inserted in the opening of said resilient means, and said shaft being retractable from and reinsertable into said opening under resilient expansion thereof.

2. Fishing reel as claimed in claim 1, wherein the one support bearing element located at said one end of said shaft is provided with an external thread, said shifting means comprises a bearing cap having an internal thread and a bottom surface and screwed on said one support bearing element, and said resilient means is provided inside said bearing cap in order, while bearing on said one support bearing element, to press said one end of said shaft against the bottom surface of said bearing cap.

3. Fishing reel as claimed in claim 2, wherein said resilient means comprises a metal wire in a substantially annular shape and including means for non-rotatably engaging said bearing cap.

* * * * *